United States Patent

Kume et al.

[11] Patent Number: 5,213,596
[45] Date of Patent: May 25, 1993

[54] AIR CLEANER DEVICE

[75] Inventors: Masato Kume, Nagoya; Yoshimi Suzuki, Obu; Naoki Maeno, Okazaki, all of Japan

[73] Assignees: Nippondenso Co., Ltd.; Toyoda Boshoku Corporation, both of Kariya, Japan

[21] Appl. No.: 741,864

[22] Filed: Aug. 7, 1991

[30] Foreign Application Priority Data

Aug. 9, 1990 [JP] Japan .................................. 2-213471
Jul. 26, 1991 [JP] Japan .................................. 3-187592

[51] Int. Cl.$^5$ ............................................ B01D 46/00
[52] U.S. Cl. ........................................ 55/481; 55/493; 55/497; 55/499; 55/502; 55/521
[58] Field of Search ................. 55/481, 493, 497, 499, 55/502, 521

[56] References Cited

U.S. PATENT DOCUMENTS

| | | | |
|---|---|---|---|
| 3,399,477 | 4/1968 | Beckmeyer | 55/481 |
| 4,363,643 | 12/1982 | Elhrador et al. | 55/481 |
| 4,543,112 | 9/1985 | Ackley et al. | 55/502 |
| 4,925,469 | 5/1990 | Clement et al. | 55/481 |
| 5,030,264 | 7/1991 | Klotz et al. | 55/481 |

FOREIGN PATENT DOCUMENTS

| | | |
|---|---|---|
| 51-23763 | 6/1976 | Japan . |
| 60-14928 | 5/1985 | Japan . |
| 275562 | 12/1986 | Japan . |
| 62-69069 | 4/1987 | Japan . |
| 993773 | 6/1965 | United Kingdom .................. 55/481 |

OTHER PUBLICATIONS

Journal of Nippon Denso Technical Disclosure Feb. 15, 1990.

Primary Examiner—Bernard Nozick
Attorney, Agent, or Firm—Cushman, Darby & Cushman

[57] ABSTRACT

An air cleaner device includes a filter element for filtering air and being disposed in a housing. The device comprises a hollow housing having an inlet portion, an outlet portion, and a flow passage therein which is communicated with the inlet portion and the outlet portion. The housing also has an opening which is disposed between the inlet portion and the outlet portion, and communicates the flow passage with the exterior of the housing. A filter element is inserted through the opening into the flow passage, disposed between the inlet portion and the outlet portion, so as to filter the air flowing through the flow passage. A lid is mounted on the housing for covering the opening. A resilient urging member allows the lid to be urged toward the housing so as to close the opening, and the resilient urging member allows the lid to be moved away from the opening when this urging is released. With this construction, by moving the lid, urged by the resilient urging member, to open and close the opening in the housing, the filter element can be easily inserted into and removed from the housing through the opening.

12 Claims, 9 Drawing Sheets

AIR CLEANER DEVICE

BACKGROUND OF THE INVENTION

1. Field of the Invention

This invention relates to an air cleaner device for use in an internal combustion engine or the like.

2. Description of the Prior Art

The type of air cleaner which improves the exchange of a filter element (air cleaner element) is disclosed in Journal of Nippon Denso Technical Disclosure No. 70-007.

This conventional air cleaner includes a housing of a resin or the like composed of a case and a cap. An opening is formed through an upper wall of the case, and a filter element is inserted into and removed from the case through this opening.

After the filter element is inserted into the case through the opening, a plate having a plurality of springs is inserted between the filter element and the case. The filter element is urged by the springs of the plate under a predetermined load to be supported within the case.

The plate is slidable vertically (i.e., upward and downward), and the filter element can be easily mounted relative to the case through the plate. Namely, in this conventional cleaner, the filter element can be slid vertically to be inserted into and removed from the case through the opening, without having to remove an air cleaner body from a vehicle. Therefore, the exchange of the filter element can be carried out in a short time without requiring much space.

In the above air cleaner, when the filter element is to be attached and detached, the element-urging springs are resiliently deformed so that the insertion and removal of the filter element can be carried out between the element-urging springs and a gasket. Namely, during the insertion and removal of the filter element, the filter element, while always urged the gasket by the element-urging springs, slides, and therefore the gasket may be caught between an element end plate and the housing, so that a load is applied to the gasket. This results in a possibility that the sealing ability of the gasket may be lowered because of the load exerted on the gasket. This makes it difficult to properly insert and position the filter element in the housing.

SUMMARY OF THE INVENTION

It is an object of this invention to provide an air cleaner device such that when a filter element is to be attached to and detached from a housing, the insertion and positioning of the filter element in the housing can be carried out easily.

Another object of the invention is to provide an air cleaner device in which a load, applied to a gasket when attaching and detaching a filter element, is reduced, thereby preventing a decrease in the sealing ability of the gasket.

According to one aspect of the present invention, there is provided an air cleaner device in which an air filter element is disposed, the device comprising:

a hollow housing having an inlet portion, an outlet portion, and a flow passage therein which is communicated with the inlet portion and the outlet portion, the housing also having an opening which is disposed between the inlet portion and the outlet portion, and the opening communicates the flow passage with the exterior of the housing;

a filter element inserted through the opening into the flow passage, disposed between the inlet portion and the outlet portion, so as to filter the air flowing through the flow passage;

a lid mounted on the housing and having a size for covering the opening thereof; and resilient urging means which allows the lid to be urged toward the housing so as to close the opening, the resilient urging means allowing the lid to be removed from the opening when the urging is released.

According to another aspect of the invention, there is provided an air cleaner device comprising:

a hollow housing having an inlet portion, an outlet portion, and a flow passage therein which is communicated with the inlet portion and the outlet portion, the housing also having an opening which is disposed between the inlet portion and the outlet portion, and communicates the flow passage with the exterior of the housing;

a filter element inserted through the opening into the flow passage, disposed between the inlet portion and the outlet portion, so as to filter the air flowing through the flow passage, the filter element having opposite side surfaces, and the filter element having an end plate mounted on an outer periphery thereof;

a lid mounted on the housing for opening and closing the opening;

a generally annular wall portion which is formed on an inner peripheral surface of the housing and is exposed to the flow passage;

resilient means for resiliently urging one of the opposite side surfaces of the filter element to resiliently urge the end plate of the filter element toward the wall portion;

a gasket provided between the wall portion and the end plate to form a seal therebetween; and guide members having respective contact portions with which the end plate is contacted in the process of inserting the filter element through the opening into the flow passage, the contact portions being so arranged that a seal surface of the end plate for contact with the gasket is moved away from the wall portion when the end plate is contacted with the contact portions, and then the contact is released upon further insertion of the filter element into the flow passage, so that the end plate is resiliently urged toward the wall portion through the gasket interposed between the end plate and the wall portion.

DETAILED DESCRIPTION OF THE PREFERRED EMBODIMENTS

Figure 1:
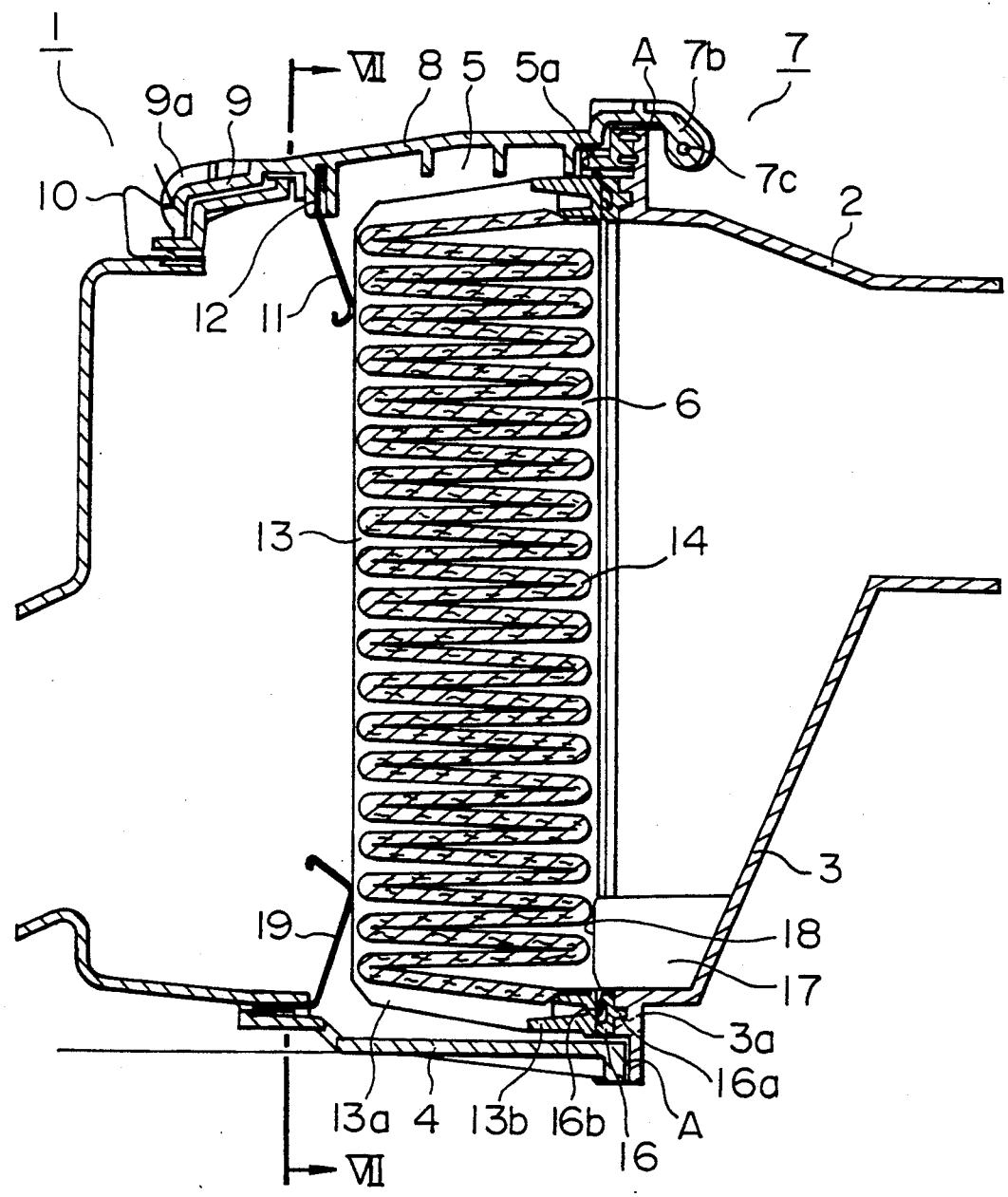
FIG. 1 is a vertical cross-sectional view of an important portion of an air cleaner device according to the present invention.

One preferred embodiment of the present invention is shown in FIGS. 1 to 9. As shown in FIG. 1, a housing 2 of an air cleaner 1 is composed of a cap 3 and a case 4. The cap 3 and the case 4 each are injection-molded from a thermoplastic resin, and then are welded together at a welding surface A by vibration welding to provide an integral construction.

Figure 8:
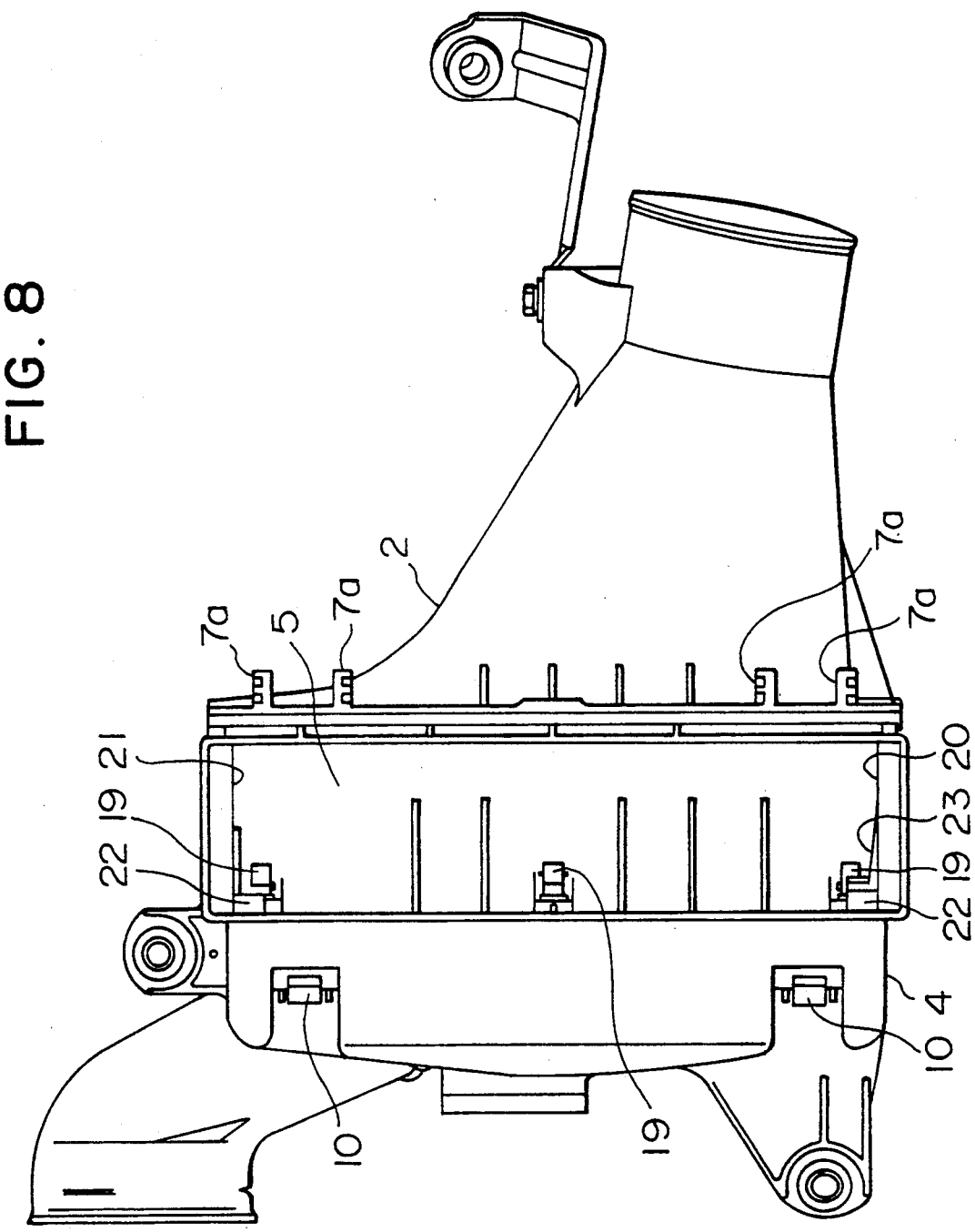
FIG. 8 is a plan view of a housing of the air cleaner device of FIG. 1, with an air cleaner lid removed.

As shown in FIG. 8, an opening 5 of a generally rectangular shape is formed through an upper wall of the case 4, and the interior and exterior of the housing 2 are communicated with each other through the opening 5. The shape of the opening 5 is generally identical to a transverse cross-sectional shape of a filter (air cleaner) element 6 mounted within the housing 2. The shape of the opening 5 is suitably determined depending on the shape of the element to be mounted in the air cleaner.

Figure 2:
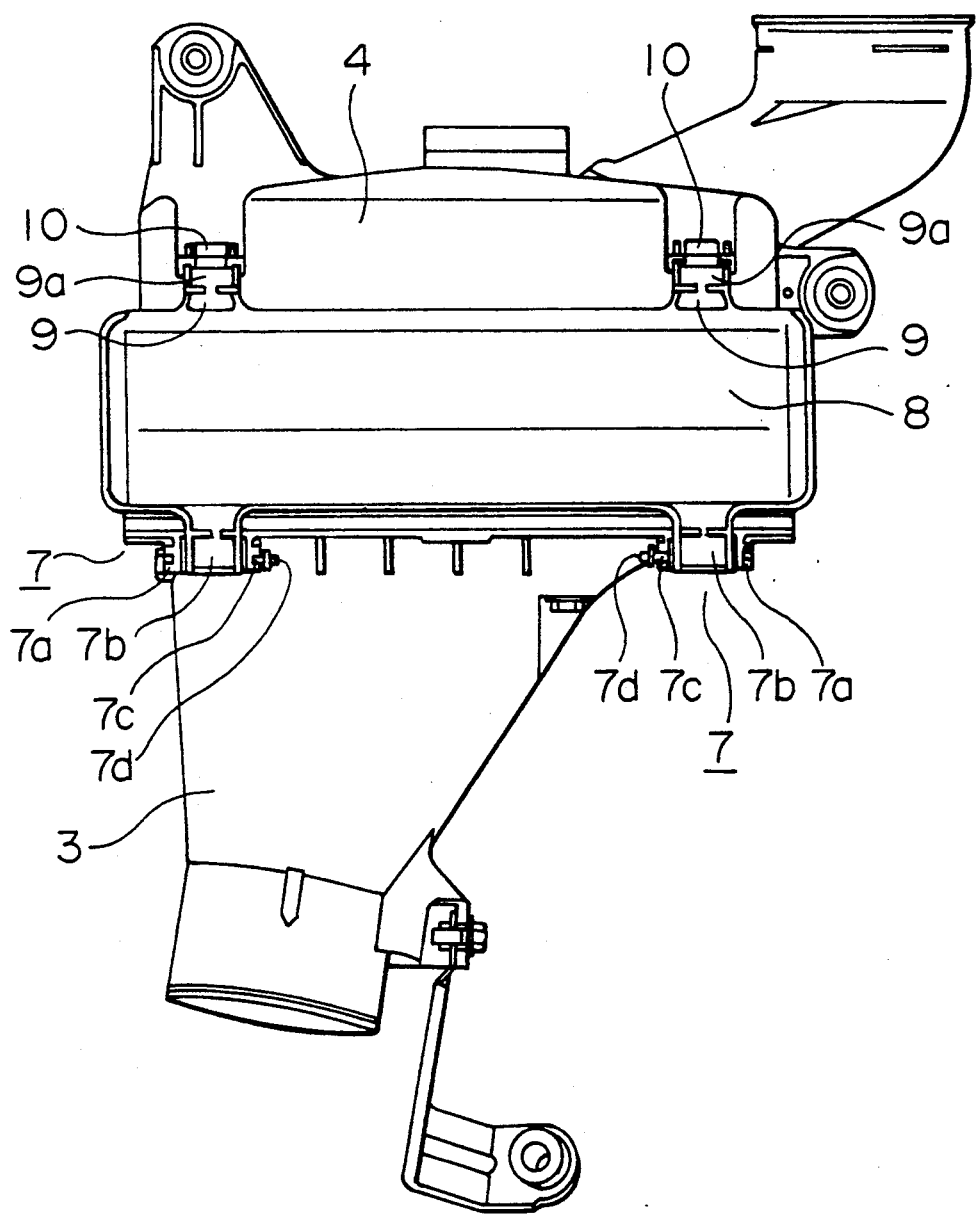
FIG. 2 is a plan view of the air cleaner device.

As shown in FIGS. 1 and 2, a lid 8 for opening and closing the opening 5 is pivotally mounted by a pair of hinge mechanisms 7 on that portion of an upper wall of the cap 3 disposed adjacent to the opening 5. Each of the hinge mechanisms 7 comprises a support portion 7a formed on the upper wall of the cap 3, a projection 7b projecting from the lid 8 toward the cap 3 and connected to the support portion 7a, and a pin 7c. The pin 7c extends through the support portion 7a and the projection 7b to engage them to each other. Thus, the lid 8 is pivotally mounted for angular movement relative to the housing 2. At least one retainer ring 7d is fixedly mounted on one end of each pin 7c so as to prevent an axial withdrawal of the pin 7c. The lid 8 is generally in the form of a rectangular plate as a whole, and engagement projections 9 are formed on that side of the lid 8 remote from the hinge mechanisms 7. Bent portions of clamps 10 fixedly mounted on the case 4 are adapted to be engaged respectively in recesses 9a formed respectively in the engagement projections 9, so as to fix the lid 8 against movement. If part of each of the projections 7b has a notch configuration, the lid 8 can be detachably mounted on the housing 2.

As shown in FIG. 1, three upper springs (resilient members) 11 for urging the element 6 are fixedly mounted on the inner side or surface of the lid 8, and these upper springs 11 urge the element 6 toward the cap 3 when the lid 8 is in its closed condition.

Each of the upper springs 11 for urging the element is made of a bent leaf spring, and is fixedly fitted at its one end in a holder hole 12 formed in the inner surface of the lid 8. The other, or free, end of the upper spring 11 which is bent is held against and urges an end plate 13 of the element 6.

A case wall 5a, which forms one side of the peripheral edge of the opening 5 close to the cap 3, is projected beyond a seal surface of a gasket 16 toward the case 4. Therefore, when the element 6 is properly mounted within the housing 2, part of the element 6 is extended beyond the end surface of the case wall 5a toward the cap 3, so that the case wall 5a is partially overhung relative to the element 6. Therefore, although the forward and backward movement of the element 6 is allowed, the upward and downward movement of the element 6 is prevented because of its interference with the case wall 5a, and therefore the positioning of the element 6 in the upward and downward direction is made. Also, because of the above construction, element 6 can not be removed merely by pulling the element 6 upward. To remove element 6, the element 6 must first be tilted toward the case 4 to such an extent as not to interfere with the case wall 5a, and then must be pulled upward.

Figure 3:
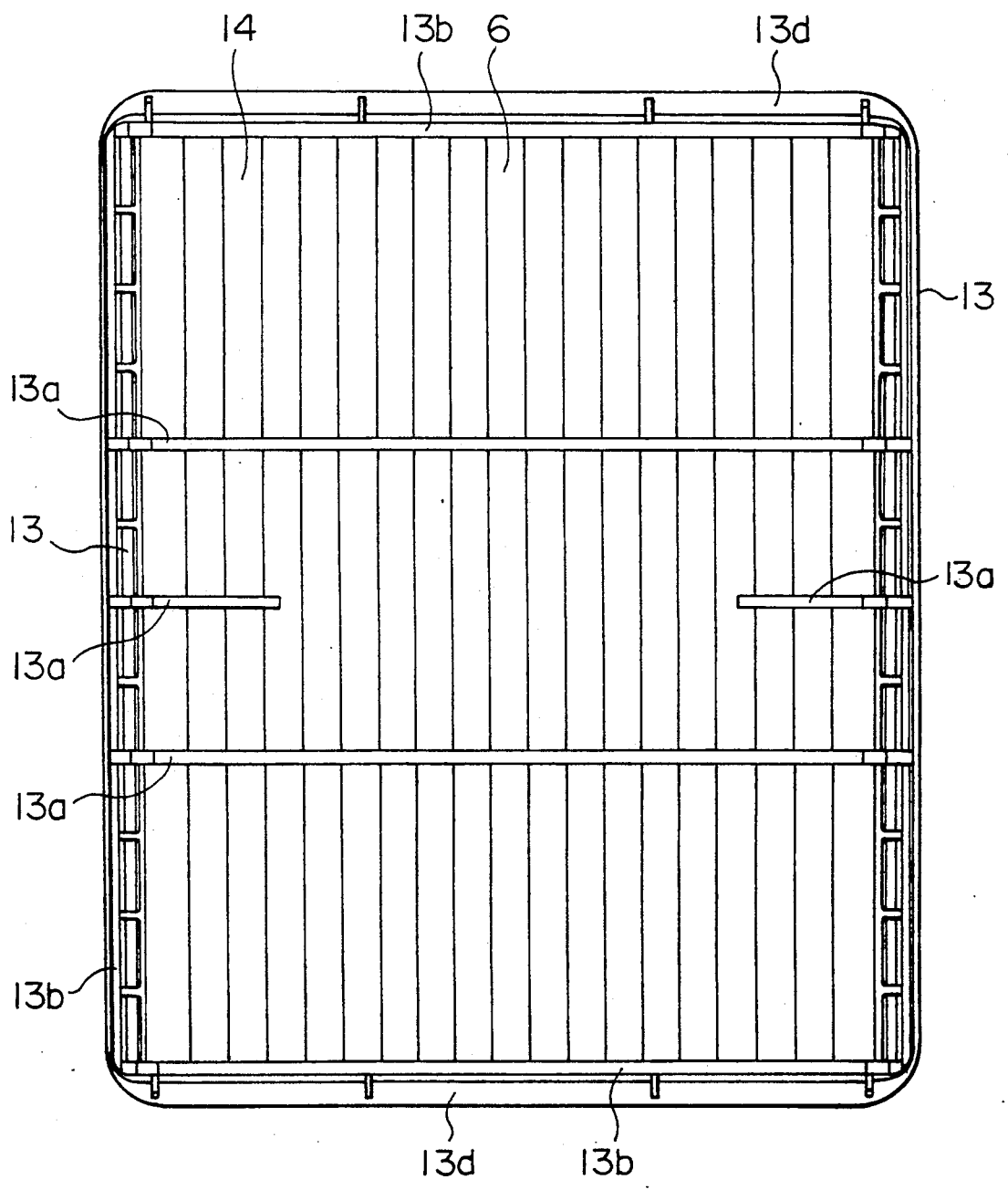
FIG. 3 is a bottom view of an air cleaner (filter) element according to the invention.
Figure 4:
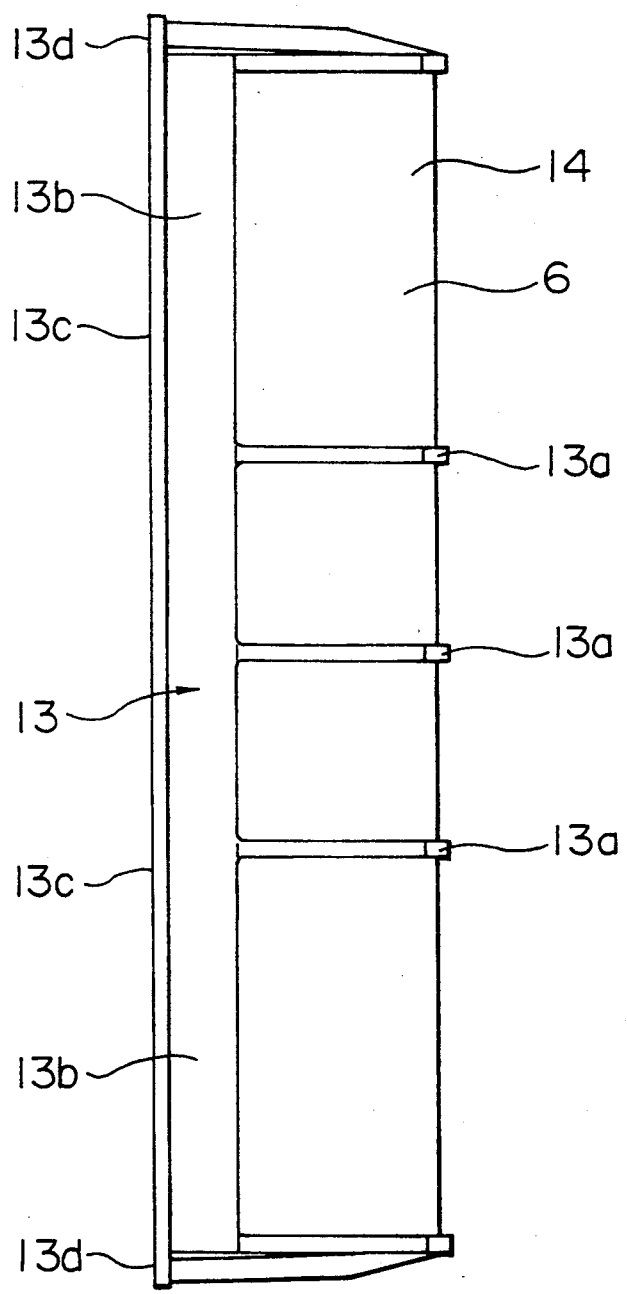
FIG. 4 is a side-elevational view of the element.

FIG. 3 is a bottom view of the element 6 of the present invention, and the FIG. 4 is a side-elevational view of the element 6.

As is clear from FIGS. 3 and 4, the element 6 has a generally rectangular parallelepipedic shape. The element 6 comprises a filter member 14 folded in a zigzag manner, and the end plate 13 supporting the filter member 14. The end plate 13 is provided transversely of the zigzag portions of the filter member 14 and covers the entire height of these zigzag portions. The end plate 13 includes reinforcement portions 13a for preventing the deformation of the filter member 14 by the air pressure, an outer frame portion 13b surrounding the clean side of the filter member 14, an outer frame surface 13c (which is an outer surface of the outer frame portion 13b) for intimate contact with the gasket 16, and a peripheral flange 13d extending outwardly from the outer portion of the outer frame portion 13b.

Figure 5:
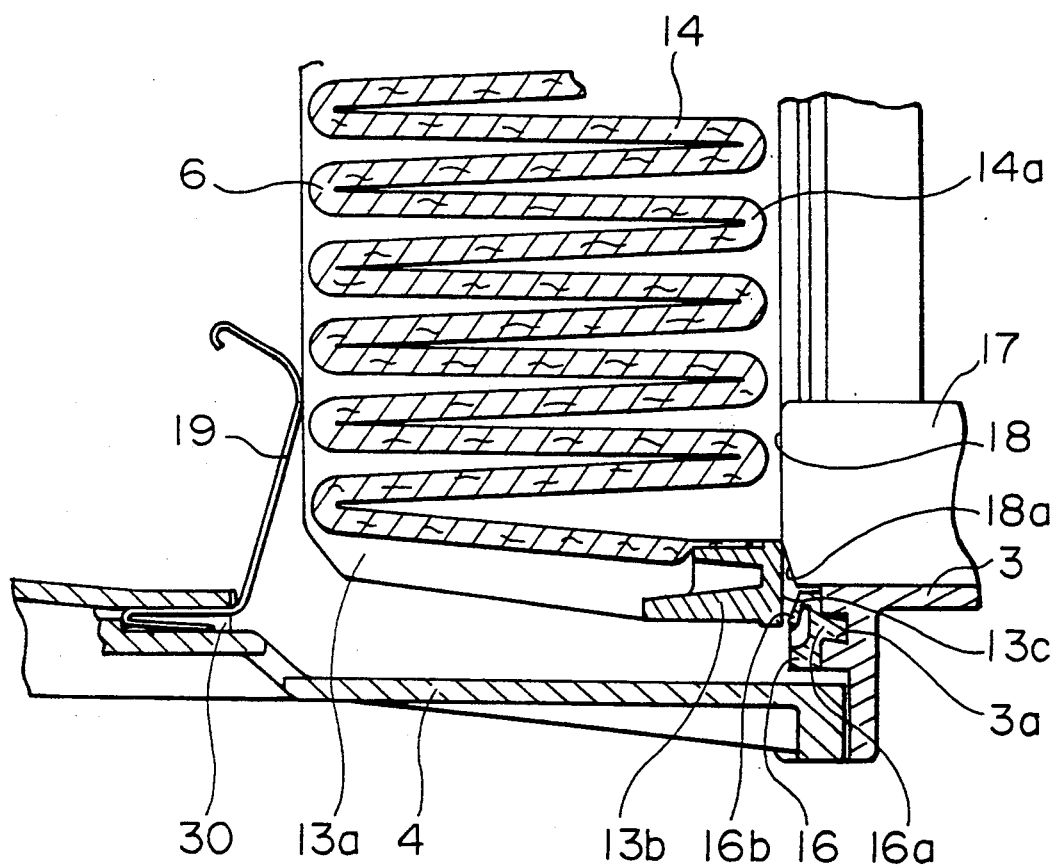
FIG. 5 is an enlarged, vertical cross-sectional view of an important portion of the air cleaner device shown in FIG. 1.

As shown in FIG. 5, when the element 6 is mounted in place, the outer frame surface 13c of the end plate 13 is held in intimate contact with the gasket 16 to provide a seal, therefore the air on the clean side of the element 6 is prevented from being mixed with the air on the dusty side of the element 6.

Figure 6:
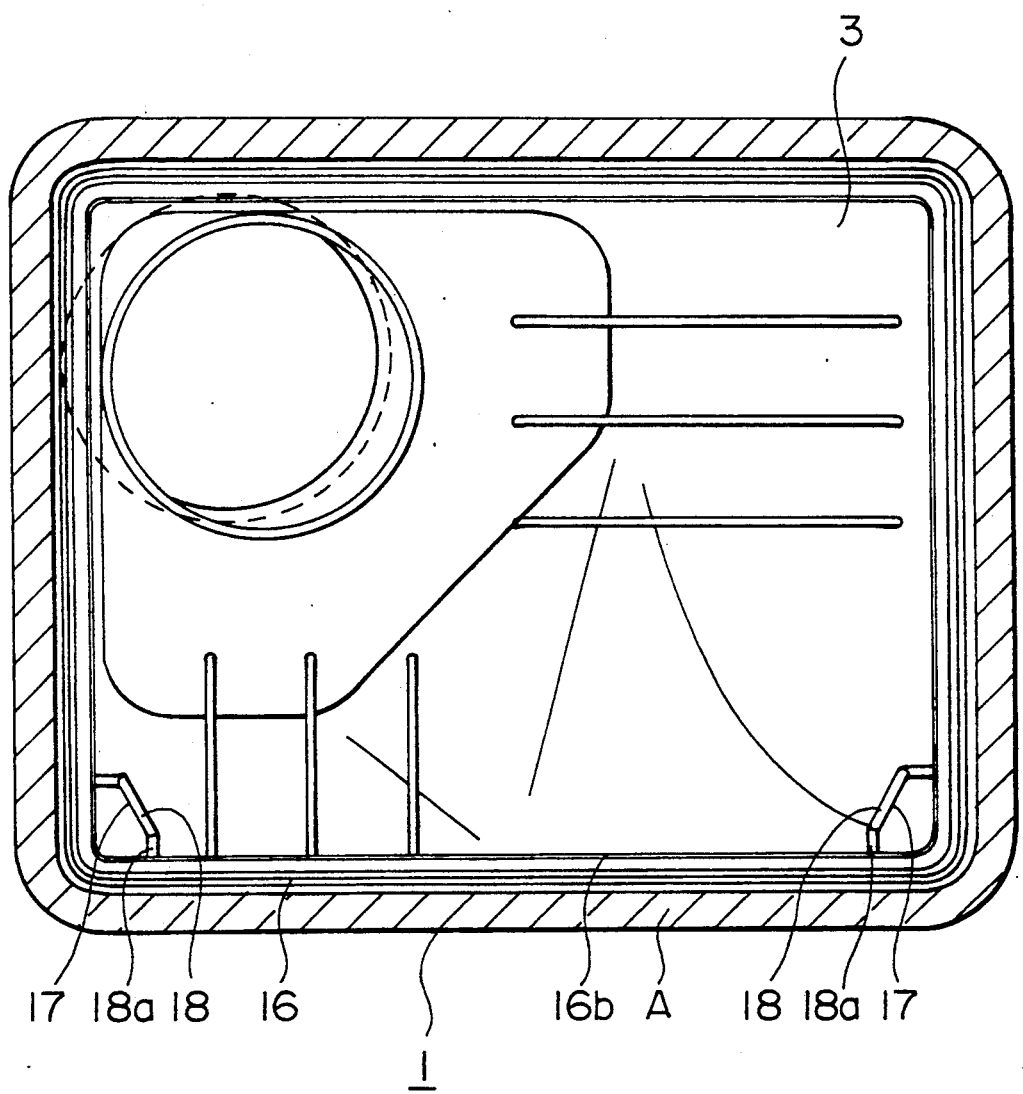
FIG. 6 is a front-elevational view of an air cleaner cap of the air cleaner device of FIG. 1.

The annular gasket 16 is mounted around the entire periphery of the cap 3 (see FIG. 6). One continuous protuberance 16a is formed on the surface of the gasket 16 to be attached to the cap 3, and extends over the entire periphery of the gasket 16. A groove 3a corresponding to the protuberance 16a is formed in the cap 3 and extends over the entire periphery of the cap 3. The protuberance 16a is fitted in the groove 3a, and an adhesive is applied to these fitted portions to enhance the strength of bonding between the gasket 16 and the cap 3.

The sealing side of the gasket 16 has a generally recumbent U-shape, and in a sealed condition, a distal end of a lip 16b formed at the inner peripheral portion of the gasket 16 is bent outwardly. Therefore, even if the air intends to pass from the dusty side to the clean side through the gasket 16, the air flow urges the lip 16b against the outer frame surface 13c of the end plate 13, so that a positive seal is provided between the gasket 16 and the end plate 13.

FIG. 5 is an enlarged cross-sectional view of a portion of the air cleaner of the invention, showing a process of attaching and detaching the element 6.

Plate-like projections 17 are provided at the lower portion of the cap 3, and are disposed inwardly of the gasket 16 (see FIG. 6). The projections 17 are projected toward the element 6. A distal end surface 18 of the projection 17 contacts with the outer frame surface 13c of the element end plate 13, and is projected slightly beyond the seal surface of the gasket 16 toward the element 6. When the element 6 is to be attached and detached, the element end plate 13 slides over the distal end surface 18, so that the gasket 16 will not be rubbed by the outer frame surface 13c of the end plate 13 and will not be caught between the outer frame surface 13 and the cap 3.

A lower portion 18a of the distal end surface 18 of the projection 17 is tapered or slanting toward the gasket 16. This is to prevent the outer frame portion 13b from interfering with the projection 17 when withdrawing the element 6, thereby facilitating the removal of the element 6. Due to the tapered configuration of the lower portion 18a of the distal end surface 18 of the projection 17, the outer frame surface 13c of the element end plate 13 can slide easily into contact with the distal end surface 18 of the projection 17.

As in the lid 8, three lower springs (resilient members) 19 for urging the element 6 are fixedly secured to the bottom of the case 4 at their one ends which are fitted respectively in support holes 30. The other or free ends of these springs which are bent are held respectively against the reinforcement portions 13a to urge the end plate 13.

As shown in FIG. 1, when the element 16 is mounted in position within the housing 2, the distal end of the projection 17 is slightly projected toward the element 6. However, the height of the reinforcement portion 13a is higher than the height of the zigzag portions of the filter member 14, and the end 14a of the filter member 14 is spaced from the end of the reinforcement portion 13a. The amount of this spacing is larger than the projecting distance of projection 17. Therefore, the projection 17 and the filter member 14 will not interfere with each other, and the projection 17 will not damage the zigzag portions of the filter member 14. Thus, the provision of the projections 17 will not affect the performance of the element 6 at all.

FIG. 6 is a view of the cap 3 (as seen from the side of the case) through the welding surface A between the cap 3 and the case 4 of the housing 2 of the air cleaner according to the invention.

The cross-sectional shape of the case 4 at the welding surface A of the air cleaner 1 is generally rectangular. The plate-like projections 17 are provided respectively at two lower corners of the cap 3, and extend perpendicular to the sheet of FIG. 6 away from the back side of this sheet. At a position immediately inwardly of the welding surface A, the gasket 16 of an elastic material such as rubber is fixed by an adhesive or the like to the cap 3 over the entire periphery of the cap 3. In this embodiment, although the projections 17 are provided at the corners of the cap 3, it is not always necessary to provide them at the corners, and these projections may be replaced by ribs provided intermediate the two lower corners of the cap 3 and disposed perpendicular to the gasket 16.

Figure 7:
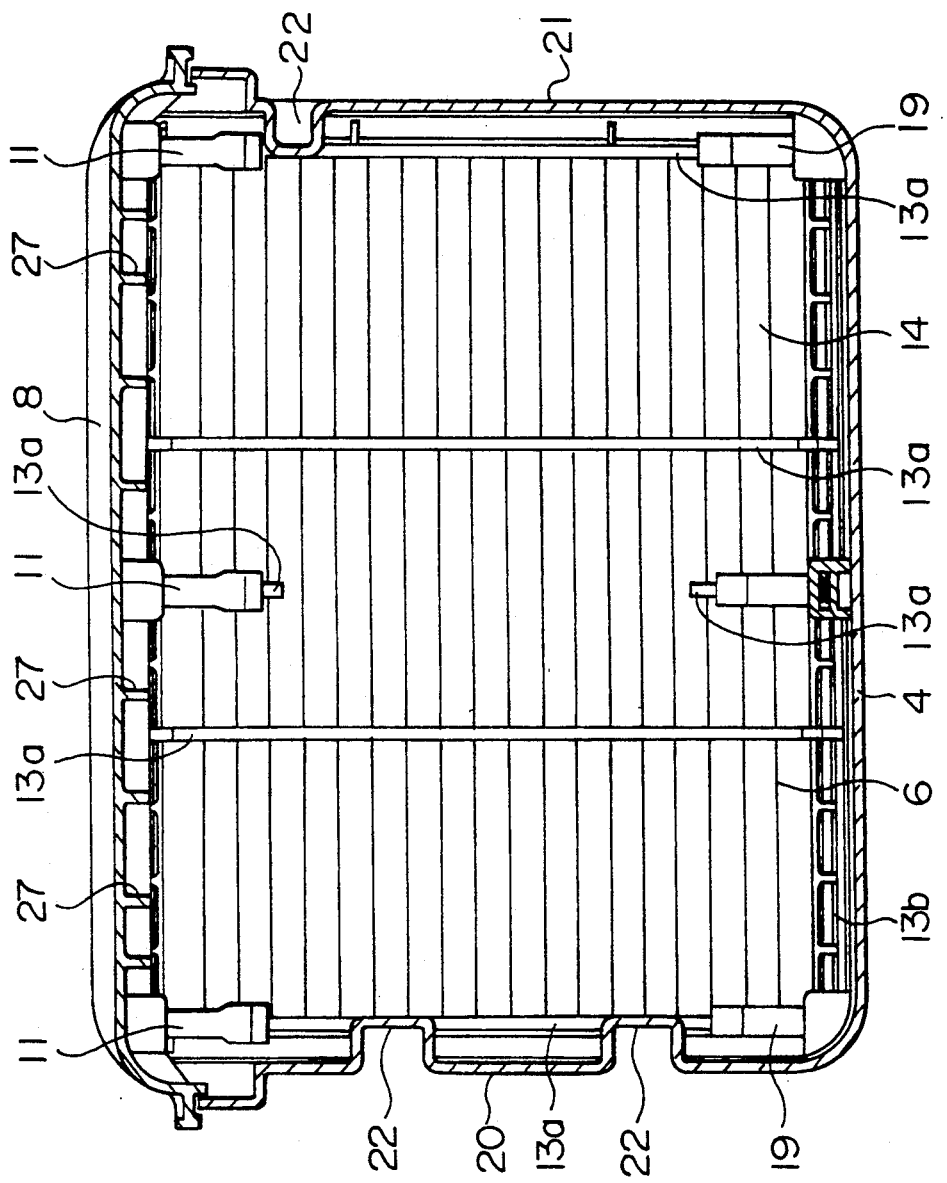
FIG. 7 is a vertical cross-sectional view taken along the line VII—VII of FIG. 1.

FIG. 7 is a view (as seen from the side of the case) taken along the line VII—VII of FIG. 1, with the element 6 mounted in position within the housing 2.

The element 6 is urged toward the cap 3 (i.e., toward the back side of the sheet of FIG. 7) by the six leaf springs (i.e., the three element-urging upper springs 11 mounted on the lid 8 and the three element-urging lower springs 19 mounted the bottom of the case 4). The upper and lower springs 11 and 19 are all held in contact with the reinforcement portions 13a of the end plate 13, respectively, and are not in contact with the filter member 14 of the element 6. The lower spring 19 is made of a leaf spring having a uniform width throughout the length thereof, but a leaf spring constituting the upper spring 11 has a distal portion wider than the fixed proximal portion thereof. With this arrangement, even if the lid 8 on which the upper springs 11 are mounted is displaced laterally due to a play in the hinge mechanism 7, the wider distal portion of each upper spring 11 absorbs this lateral displacement so as to prevent the upper spring 11 from being disengaged from the reinforcement portion 13a of the end plate 13 of the element 6.

Two element insertion guides 22 are formed on a first side wall 20 of the case 4, and one element insertion guide 22 is formed on a second side wall 21 of the case 4 opposed to the side wall 20. Each of these element insertion guides 22 bulges toward the inside of the case 4 in a direction generally perpendicular to the direction of insertion and removal of the element 6. The lower springs 19 for urging the element 6 are provided respectively at three portions (i.e., the opposite ends and the central portion) of the bottom of the case 4.

FIG. 8 is a plan view of this embodiment, with the lid 8 removed from the housing 2. The number and positions of the above element insertion guides 22 formed on the side walls 20 and 21 of the case 4 are suitably determined. These guides 22 determine the space for receiving the element 6 therein, and serves to guide the element 6 when the element 6 is inserted into the case 4. Therefore, when the element 6 is to be inserted, the element 6 will not interfere with the lower springs 19 and other parts, and hence will not deform such parts or deteriorate the performance thereof. Further, a reverse flow of a fluid from an engine, as caused by a back fire, may occur when the element 6 is mounted in the housing 2. In this case, even when the element 6 is urged toward the case 4 by this reverse-flow fluid, the element insertion guides 22 interfere with the element 6 to support the element 6, and therefore any displacement of the element 6 toward the case 4 is minimal. Therefore, the upper springs 11 (not shown in FIG. 8) and the lower springs 19, which urge the element 6 toward the cap 4, will not be flexed and will not be subjected to an undue load. The element insertion guides 22 prevent the upper and lower springs 11 and 19 from being subjected to large loads, and therefore deformation of these springs and a change in urging force of these springs are prevented.

Figure 9:
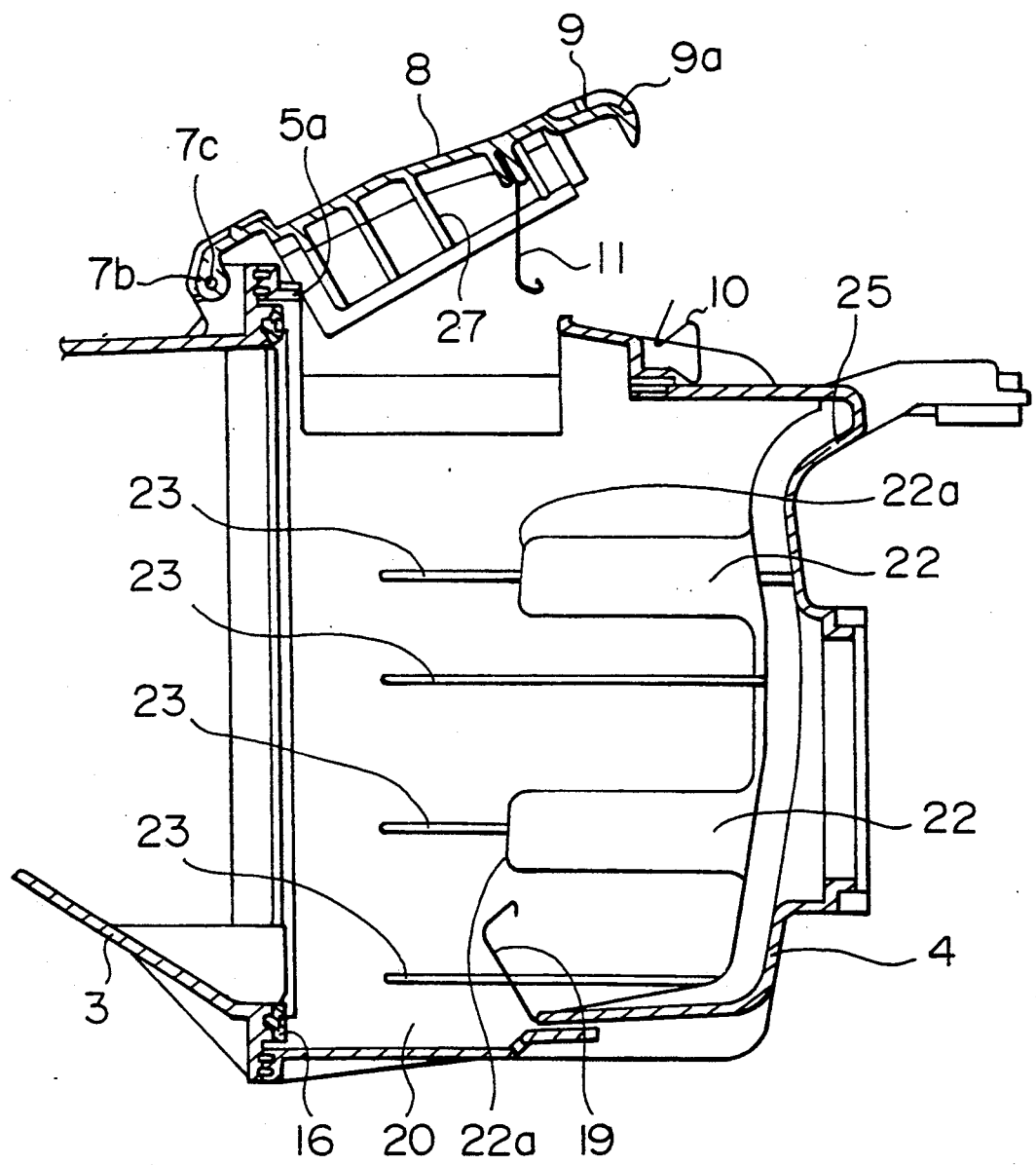
FIG. 9 is a vertical cross-sectional view of an important portion of the air cleaner device of FIG. 1, with the filter element removed.

As shown in FIGS. 8 and 9, reinforcement ribs 23 of a triangular shape are formed on ends 22a of the element insertion guides 22 and those portions of the side surface of the case 4 adjacent to the element insertion guides 22, and extend from the case 4 toward the cap 3. The reinforcement ribs 23 increase the rigidity of the case 4, and also form the element-receiving space into a trapezoidal shape. The portion of the element receiving space close to the case 4 is narrower in width than that portion thereof close to the cap 3.

As shown in FIG. 4, that portion (the dusty side) of the element 6 close to the case 4 is narrower in width than that portion thereof (the clean side) close to the cap 3. Therefore, when the element 6 is to be attached with its dusty side and clean side reversed, the flange 13d of the end plate 13 of the element interferes with the reinforcement ribs 23, so that the element 6 can not be attached. Thus, reinforcement ribs 23 also serve to prevent a reverse attachment of the element 6.

FIG. 9 is a vertical cross-sectional view of the air cleaner of the invention through a plane perpendicular to the welding surface A, showing the main portion of the air cleaner, with the element 6 removed.

The two element insertion guides 22 are formed on the side wall 20 of the case 4, and bulge away from the back side of the sheet of FIG. 9, and the end surfaces 22a of these guides 22 are slightly inclined.

The two reinforcement ribs 23 extend respectively from the end faces 22a of the element insertion guides 22, and also the two reinforcement ribs 23 extend from a side wall surface 25 of the case 4 disposed at the inlet side. Thus, the four reinforcement ribs 23 are formed on the side wall 20 of the case 4.

A lattice-like reinforcement plate 27 is formed on the inner surface of the lid 8. The reinforcement plate 27 not only increases the rigidity of the lid 8, but also serves to complete the insertion of the element 6. Thus, even when the element 6 is not fully inserted into the housing 2, the reinforcement plate 27 pushes the end plate 13 of the element 6 when the lid 8 is closed, so that the element 6 is inserted completely. Thus, merely by closing the lid 8, the insertion of the element 6 is completed.

What is claimed is:

1. An air cleaner device for filtering air comprising:
   a hollow housing having an inlet portion, an outlet portion, and a flow passage therein which is communicated with said inlet portion and said outlet portion, said housing also having an opening which is disposed between said inlet portion and said outlet portion, and communicates said flow passage with the exterior of said housing;
   a filter element inserted through said opening into said flow passage, disposed between said inlet portion and said outlet portion, so as to filter air flowing through said flow passage, said filter element having a filtering surface;
   a lid mounted on said housing for opening and closing said opening;
   a plurality of first resilient members fixedly secured to a reverse surface of said lid; and
   a plurality of second resilient members fixedly secured to a bottom of said flow passage;
   said plurality of first resilient members having respective free ends remote from said lid, and said plurality of second resilient members having respective free ends remote from said bottom of said flow passage, and said free ends of said first and second resilient members resiliently urging said filtering surface of said filter element when said opening is closed by said lid, thereby holding said filter element against movement in said flow passage.

2. An air cleaner device according to claim 1, wherein reinforcement members are mounted on said filtering surface of said filter element, said free ends of said first and second resilient members being held in contact with said reinforcement members, respectively.

3. An air cleaner device according to claim 1, wherein said plurality of first resilient members is equal in number to said plurality of said second resilient members, said plurality of first resilient members as well as said plurality of second resilient members being arranged uniformly relative to said filtering surface of said filter element.

4. An air cleaner device according to claim 1, wherein said housing has an annular wall portion which is provided at said flow passage and generally corresponds in shape to an periphery of said flow passage, an annular gasket being mounted on said annular wall portion, and said filter element having an end plate mounted on an outer periphery thereof, said end plate being held in contact with said gasket, whereby when said filtering surface of said filter element is resiliently urged by said free ends of said first and second resilient members, said end plate is resiliently urged against said gasket to thereby form a seal between said end plate and said gasket.

5. An air cleaner device for filtering air comprising:
   a hollow housing having an inlet portion, an outlet portion, and a flow passage therein which is communicated with said inlet portion and said outlet portion, said housing also having an opening which is disposed between said inlet portion and said outlet portion, and communicates said flow passage with the exterior of said housing;
   a filter element inserted through said opening into said flow passage, disposed between said inlet portion and said outlet portion, so a to filter air flowing through said flow passage, said filter element having a first side surface and a second side surface, and said filter element having an end plate mounted on an outer periphery thereof;
   a lid mounted on said housing for opening and closing said opening;
   a generally annular wall portion which is formed on an inner peripheral surface of said housing and is exposed to said flow of air through said flow passage;
   resilient means coupled to said housing for resiliently biasing said first side surface of said filter element to resiliently bias said end plate toward said wall portion;
   a gasket provided between said wall portion and said end plate to form a seal therebetween; and
   guide members coupled to said wall portion of said housing having respective contact portions which receive said end plate when said filter element is inserted through said opening into said flow passage, said contact portions being so arranged that a seal surface of said end plate for contact with said gasket is biased away from said wall portion and when said end plate is received into said contact portions, and said end plate is released from said contact portions upon further insertion of said filter element into said flow passage, so that said end plate is resiliently biased toward said wall portion through said gasket.

6. An air cleaner device according to claim 5, wherein when said end plate is released from said contact portions of said guide members, said seal surface of said end plate is projected beyond said second side surface of said filter element, and also said contact portions are projected beyond said seal surface, so that said contact portions are disposed in spaced relation to said second side surface of said filter element.

7. An air cleaner device according to claim 5 wherein said lid comprises an inner surface and an outer surface, said inner surface having a convex portion ensuring that said filter element is properly disposed within said flow passage when said lid closes said opening.

8. An air cleaner device according to claim 5, wherein said guide members are disposed within said housing and provided at a bottom portion of said housing, said guide members being disposed inwardly of said wall portion, said contact portions facing said second side surfaces of said filter element, and said end plate being formed on the outer periphery of said filter element to provide a flange.

9. An air cleaner device according to claim 8, wherein said gasket is provided at said wall portion, said end plate being urged against said gasket to form the seal therebetween.

10. An air cleaner device for filtering air comprising:

a hollow housing having an inlet portion, an outlet portion, and a flow passage therein which is communicated with said inlet portion and said outlet portion, said housing also having an opening which is disposed between said inlet portion and said outlet portion, and communicates said flow passage with the exterior of said housing;

a filter element inserted through said opening into said flow passage, disposed between said inlet portion and said outlet portion, so as to filter air flowing through said flow passage, said filter element being disposed in intersecting relation to said flow passage;

a lid mounted on said housing for opening and closing said opening;

resilient members coupled to said housing having one end fixedly mounted on a bottom portion of said flow passage on an inner side of said housing and a free end resiliently biasing said filter element to withstand against movement in said flow passage; and guide members coupled to said wall portion of said housing for guiding said filter element when said filter element is inserted into said flow passage through said opening, said guide members being provided on said inner side of said housing along said flow passage, said guide members comprising a supporting surface being arranged related to said free ends of said resilient members so that said filter element is properly inserted into said flow passage to be biased by said resilient members to withstand against movement in said flow passage.

11. An air cleaner device according to claim 10, wherein said filter element has a generally planar, rectangular parallelepipedic shape, having end surface, a first side surface directed toward said inlet portion and a second side surface directed toward said outlet portion.

12. An air cleaner device according to claim 11, wherein said opening has a rectangular shape, and is greater in size than said side surfaces of said filter element.

* * * * *